(12) United States Patent
Sun et al.

(10) Patent No.: US 7,664,171 B2
(45) Date of Patent: Feb. 16, 2010

(54) UPLINK BURST EQUALIZING METHOD IN BROAD WIDE ACCESS SYSTEM

(75) Inventors: Changyin Sun, Shenzhen (CN); Yunfeng Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 613 days.

(21) Appl. No.: 10/583,813

(22) PCT Filed: Dec. 26, 2003

(86) PCT No.: PCT/CN03/01128

§ 371 (c)(1),
(2), (4) Date: Jun. 22, 2006

(87) PCT Pub. No.: WO2005/064830

PCT Pub. Date: Jul. 14, 2005

(65) Prior Publication Data

US 2007/0147489 A1    Jun. 28, 2007

(51) Int. Cl.
    H03H 7/30    (2006.01)
(52) U.S. Cl. .............. 375/231; 375/233; 375/346; 375/232; 375/260; 375/350; 329/316
(58) Field of Classification Search ........... 375/231, 375/232, 233, 340, 260, 350, 346, 316, 341; 329/316
See application file for complete search history.

(56) References Cited

U.S. PATENT DOCUMENTS

| 5,268,930 | A | * | 12/1993 | Sendyk et al. ........... 375/231 |
| 5,297,165 | A | * | 3/1994 | Ueda et al. ........... 375/230 |
| 5,970,092 | A |   | 10/1999 | Currivan ........... 375/232 |
| 7,043,578 | B2 | * | 5/2006 | Hufferd ........... 710/105 |
| 7,099,409 | B2 | * | 8/2006 | Yousef ........... 375/340 |
| 7,110,449 | B2 | * | 9/2006 | Heo et al. ........... 375/233 |
| 7,280,615 | B2 | * | 10/2007 | Roberts ........... 375/316 |
| 2003/0227968 | A1 | * | 12/2003 | Kim et al. ........... 375/233 |
| 2004/0213361 | A1 | * | 10/2004 | Chen et al. ........... 375/340 |

FOREIGN PATENT DOCUMENTS

| CN | 1158033 A | 8/1999 |
| WO | WO 01/97475 | 12/2001 |

\* cited by examiner

*Primary Examiner*—Chieh M Fan
*Assistant Examiner*—Eva Y Puente
(74) *Attorney, Agent, or Firm*—Thomas, Kayden, Horstemeyer & Risley, LLP

(57) ABSTRACT

A method for uplink burst equalization in broad wide access system, using the form of combining pre-training and burst equalization, that is, before transmitting user data, training the equalizer, then starting transmitting user data, in which, the equalizer uses decision user data as reference to track the changed wireless channel; if the change of channel exceeds the tracking region of equalizer, for example, the error rate exceeds threshold 1 but doesn't exceed threshold 2, the burst equalization will be performed; if the channel change exceeds the equalization region of equalizer, for example, the error rate exceeds threshold 2, the training will be performed again. By using the form of combining pre-training and burst equalization, setting different thresholds for handoff, the present invention greatly prolongs the intervals of subsequent pre-training process, thereby reducing the times of pre-training and increasing the effective bandwidth; By introducing burst equalization process, the present invention also decreases the requirement of system on operation occasion (for example, the static channel or the interval of bursts should be short), thereby increasing the application occasions of product.

8 Claims, 4 Drawing Sheets

UPLINK BURST EQUALIZING METHOD IN BROAD WIDE ACCESS SYSTEM

TECHNICAL FIELD

The present invention relates to the field of wireless telecommunication system based on time division multiple access TDMA, particularly, relates to the technique for equalizing uplink burst in broad wide access system (BWA as abbreviation) employing TDMA mechanism.

TECHNICAL BACKGROUND

With the development of telecommunication technique, the broad wide access system BWA, as the substitute technique of digital subscribe loop DSL and wire transmission technique, is arising people's interest continuously. BWA not only provides services that can compete with the services provided by wire transmission, but also provides services that can not be provided by wire transmission in many situations. Generally speaking, there are two kinds of work situations for BWA providing high speed data service on wireless channel, that is, line of sight (LOS) transmission and none line of sight (NLOS) transmission. The first generation BWA system works in LOS situation, mainly employing single carrier high efficiency modulation technique, such as quad-phase shift key QPSK, quadrature amplitude modulation QAM etc., and decision feedback equalization DFE technique as well as fixed direction antenna technique to overcome the influence of multiple paths and interference, but the disadvantage of this system is in that its coverage area is very small due to the line of sight. The next generation BWA system will operate in NLOS situation, wherein, because without the direct signal component of LOS situation, it will be greatly influenced by multi-path, its mainstream techniques are Orthogonal Frequency Division Multiplexing OFDM technique and multi-antenna technique, so as to overcome the disadvantage of the first BWA system. Currently, the technique standard of the above two situations is drawn by IEEE802.16 broad wide access workgroup.

The first generation BWA system usually uses the frequency division duplex FDD from point to point, in which the uplink uses TDMA, the downlink uses time division multiplexing TDM; the uplink modulation form is QPSK-16QAM, the downlink modulation form is QPSK-64QAM. But currently, the uplink usually uses burst QPSK modulation, because the constellation of QPSK phase modulation is very simple, compared to QAM modulation, the ratio of signal to noise (interference) is lower, so we can employ simple equalization technique (pre-equalization and pre-training technique) or with no equalization, but the disadvantage of QPSK modulation is in that its efficiency of spectrum is very low. In order to meet the increasing requirement of uplink bandwidth for user, the efficiency of spectrum should be improved, because the simple equalization technique could have not meet the requirement when employing 16 QAM modulation and adaptive modulation technique, the burst equalization of BWA system is become a key problem.

In existing BWA system, burst equalization mainly use two kinds of forms, one is pre-equalization technique, and the other is pre-training technique.

Pre-equalization technique: in uplink direction, setting a pre-equalizer (or precoder) on user end, during the ranging process, base station calculates the coefficient of equalizer, and sends the coefficient to user end for pre-equalization process. The idea of this method is to divide multi-path component into static part and dynamic part, in which, static part changes very slowly, and it takes very long time for the coefficient of equalizer to change once, for example, the coefficient will be updated every time the ranging process take place; while the dynamic part changes very quickly, the coefficient will be updated as long as one or several bursts occur, thus, the realization of burst equalization will be simplified. This method can also be employed in cable modem, the 1.1 version of DOCSIS protocol adds the pre-equalization part.

Pre-training technique: before transmitting user data, first sending training sequence; when the coefficient of equalizer is converged enough, transmitting user data; thus, the coefficient of equalizer at the previous burst data ends is memorized, so as to be the equalization of the next burst; once the equalizer can not work due to the change of channel, the training is performed again.

The advantage of the above two kinds of methods is in that the structure of equalizer is simple, and each burst data package does not comprise training sequence, therefore improving the efficiency; but this is only adapted to the situation of static channel or the situation that the interval of burst is very short, once not meeting the above two conditions, the burst equalization is inevitably required. At this time, the front end of each burst data package will comprise a training sequence, also referred as pre-amble or pre-amble code, however, the training sequence is an overhead for data transmission. As for adaptive equalizer, different algorithms for updating coefficient need different lengths of training sequence, for example, the length of training sequence required by recursive least square RLS algorithm is less than that of the least mean square LMS algorithm, but the former needs more calculation and is more complex than the latter.

Another method for reducing the length of training sequence is the pre-loading technique of equalizer coefficient, which first writes a group of initial coefficient value pre-calculated (estimated) into the coefficient register of equalizer before the equalizer starts training process, if the initial coefficient value of equalizer is estimated accurately enough, the equalizer will nearly enter into the convergence state before training.

U.S. Pat. No. 5,970,092 "adaptively equalized burst receiver and method for upstream broadband data" introduced a method for equalizing the burst of uplink broadband data, this method uses Newman-Holfman sequence to estimate wireless channel approximately, then pre-loads the approximation of the channel estimation into the coefficient register of equalizer by using approximating method. In this method, because the approximation of channel estimation is used, meanwhile, the coefficient of equalizer is also pre-loaded by using approximating method, the equalizer can not be convergent enough in one burst, thereby interfering the performance of the system.

SUMMARY OF THE PRESENT INVENTION

The technical problem to be solved by the present invention is to provide a method for equalizing uplink burst in broad wide access system, so as to overcome the disadvantages in existing technique that the training process is frequent, the time interval of training is short, and the convergence speed is low.

The basic idea of the present invention is: using the form of combining pre-training and burst equalization, that is, before transmitting user data, training the equalizer, then starting transmitting user data, the equalizer using decision user data as reference to track the changed wireless channel; if the channel change exceeds the track region of equalizer, for example, if the error rate exceeds threshold 1, but not exceeds threshold 2, performing burst equalization; if the channel change exceeds the equalization region of equalizer, for example, if the error rate exceeds threshold 2, performing training again.

The method of the present invention uses the form of combining pre-training and burst equalization in uplink burst equalization, in which, the equalizer uses decision feedback equalizer, comprising the following steps of:

Step 1, pre-training process: before transmitting user data, sending training sequence, and training the equalizer;

Step 2, channel track process: recording the coefficient after the convergence of equalizer, and starting transmitting user data, then the equalizer tracking wireless channel;

Step 3, if the channel change results in the error rate exceeding threshold 1, but not threshold 2, entering into the burst equalization process; and Step 4, if the channel change results in the error rate exceeding threshold 2, entering into the pre-training process again.

In the present invention, said burst equalization process firstly uses the pre-amble of one burst data package as the reference sequence, and performs channel estimation in zero correlation domain, then calculating the initial coefficient value of equalizer according to channel estimation, and pre-loading the calculated initial coefficient value into equalizer, and using pre-amble and part of user data as reference sequence to train equalizer, making the equalizer converge enough; after the training, the equalizer using the decided user data as reference sequence to equalize the user data, and outputting decision information.

In the burst equalization process of the present invention, if the pre-amble employs M sequence, the channel estimation includes: firstly, the local reference signal for generating pre-amble is bilateral cycle spreading signal of M sequence, and the local reference signal of pre-amble is a sequence composed of 1 and 0; secondly, sampling the received signal which the pre-amble corresponds to, then performing correlation operation to the sampled signal corresponding to the pre-amble and its local reference signal, therefore finishing the channel estimation.

In the burst equalization process of the present invention, said steps of calculating the initial value of equalizer coefficient further includes:

calculating the initial value of tap coefficient of forward filter:

$c(0)=h^*(0)/|h(0)|^2=1/h(0)$, other coefficients are 0;

calculating the initial value of tap coefficient of backward filter:

$[b(1)b(2)\ldots b(B)]=h^*(0)/|h(0)|^2 \times [h(1)h(2)\ldots h(B)]= 1/h(0) \times [h(1)h(2)\ldots h(B)]$;

In which, h represents channel impulse response vector, c represents the coefficient vector of forward filter of decision feedback equalizer, b represents the coefficient vector of backward filter, B is the length of coefficient vector of backward filter, wherein, the pulse with biggest amplitude is $h(0)$, the previous impulse response pulse is $[h(-n) h(-n+1) \ldots h(-1)]$, the subsequent impulse response pulse is $[h(1) h(2) \ldots h(n)]$; the coefficient of forward filter and the coefficient corresponding to subsequent impulse response pulse in equalizer is $[c(-n) c(-n+1) \ldots c(-1)]$, the coefficient corresponding to previous response pulse is $[c(1) c(2) \ldots c(n)]$.

The method of the present invention uses the form of combining pre-training and burst equalization, which makes the interval of subsequent pre-training greatly prolonged by setting different thresholds to handoff, therefore reducing the times of pre-training and increasing the effective bandwidth. By introducing burst equalization process, the present invention also makes the requirement of system on the operation occasion (such as static channel or the interval of burst is very short) greatly decreased, therefore increasing the application occasion of product; meanwhile, the present invention also uses zero correlation domain sequence to perform channel estimation, and provides a method for simply estimating the initial value of coefficient of equalizer, which greatly improves the precision of channel estimation, decreases the training time of burst equalizer, improves the convergence speed. Furthermore, the present invention provides a new method for realizing M sequence in zero correlation domain, thereby greatly enlarging the region for the present invention in selecting zero correlation domain sequence.

PREFERRED EMBODIMENT OF THE PRESENT INVENTION

Next, the technical scheme of the present invention will be further described in detail in combination with drawings and embodiments.

Figure 1:
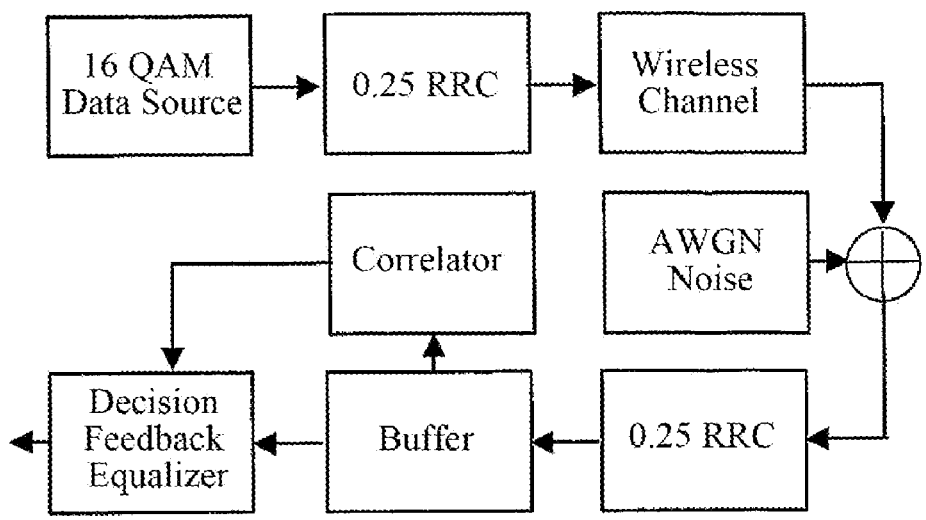
FIG. 1 is the principle block diagram of broad wide access system.

FIG. 1 is the schematic view of uplink direction of broad wide access system which employs FDD form, in which, the pulse shape filter uses root rising cosine (RRC) filter of 0.25. The transmitting end includes 16 QAM data source and 0.25 RRC. The symbol rate of user data is 5 MHz/s after being modulated by 16 QAM, the corresponding raw data rate is 20 MHz/s. The modulated data is transmitted to wireless channel through the root rising cosine filter of 0.25. After the receiving end receiving the signal, the signal adding the additive white Gaussian noise (AWGN) of receiver passes the root rising cosine filter of 0.25, then goes through the operations of frequency compensation, phase restore and estimation of the best sampling time in buffer and correlator, then enters the decision feedback equalizer to eliminate the inter-symbol interference according to one sampling rate/sampling rate on each symbol, finally the decision result of user data is obtained. The decision feedback equalizer is composed of 9 forward filters FF and 7 backward filters FB; because the maximum of multi-path delay is 1 ms, the length of wireless channel is 5, the length of filter is long enough to cover all the echoes in the channel.

The burst data package is composed of pre-amble with length of 16 and user data with 2000 symbols, in which, the pre-amble is not only used for frequency/phase estimation, but also used for estimating the best sampling-time and performing channel estimation.

In wireless data transmission, user data needs to pass wireless channel from transmitting end to receiving end. The model of wireless channel mainly describes the channel character from the following aspects: path loss (including shadow fading), multi-path time delay spreading, fading character, Doppler spreading and same channel/neighbor channel interference.

Supposing that the signal transmitted by transmitter arrives at the receiving end through several paths, and the paths which the signal passes by can be described by a time-varying channel impulse response:

$$h(t, \tau) = \sum_{k=1}^{N(t)} a_k(t)\delta(\tau - \tau_k(t))e^{j\theta_k(t)} \quad (1)$$

in which, t represents the observing time; τ represents the time for realizing pulse; N(t) represents the number of multi-path; $a_k(t)$ represents the gain of path number k; $\theta_k(t)$ represents the phase of path number k; $\tau_k(t)$ represents the arriving time of path number k.

As for non-time varying channel, equation (1) can be simplified as:

$$h(t) = \sum_{k=1}^{N} a_k \delta(t - t_k)e^{j\theta_k} \quad (2)$$

The corresponding base band receiving signal is $$y(t) = \int_{-\infty}^{\infty} x(\tau)h(t-\tau)d\tau + n(t) \quad (3)$$

$$y(t) = \sum_{k=1}^{N} a_k x(t - t_k)e^{j\theta_k} + n(t) \quad (4)$$

in which, x(t) represents the signal to be transmitted, n(t) represents additive noise.

Figure 2:
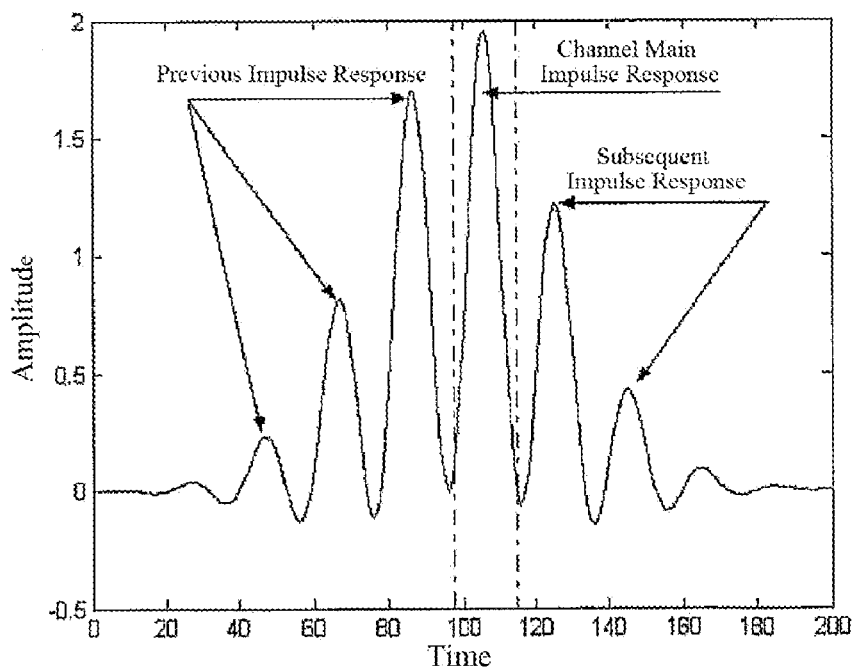
FIG. 2 is the schematic view of typical wireless channel impulse response.

Channel impulse response h(t) is as shown in FIG. 2, in which, the part with biggest amplitude is the main pulse, what locates in front of the main pulse is previous impulse response pulse, what locates behind the main pulse is subsequent impulse response pulse. In NLOS situation, because the main pulse of LOS is fading greatly, the previous impulse response pulse is stronger; while in LOS situation, the previous impulse response pulse is smaller, so, in LOS situation the channel pulse response is composed of a main pulse with a very big amplitude and a subsequent pulse.

When the received signal entering into equalizer after passing through the filter, the symbol sampling rate is t=kT, in which T represents symbol rate, then the sampling signal of received signal is the convolution of transmitted signal x and channel impulse response h and the additive noise n:

$$y(k) = \sum_{i=0}^{L-1} x(k-i)h(i) + n(k) \quad (5)$$

in which L represents the length of the channel impulse response after sampling. Spreading the equation (5), obtaining $$y(k) = h(0)x(k) + \sum_{i=0,1 \neq k}^{L-1} x(k-i)h(i) + n(k) \quad (6)$$

in which, the first item represents the anticipant symbol information at the sampling time of number k, the medial item represents the interference between symbols.

As for the interference between symbols due to multi-path, the equalizer is used to eliminate the influence. Different equalizers have different performance and different complexity of realization, the most commonly used equalizer in reality is decision feedback equalizer DFE, simple equalizer can be linearity equalizer, such as zero forcing equalizer or minimum mean squared error (MMSE) equalizer. Generally speaking, in wireless environment, the performance of DFE is better than that of linearity equalizer, that is, the minimum mean squared error it can realize is small, and the error rate is low, the reason is in that the multi-path of wireless channel can result in the channel frequency response zero, and the linearity equalizer generates very big noise gain in zero. The performance of MMSE equalizer is better than the performance of zero forcing equalizer, and MMSE equalizer can be realized more directly, while the performance of maximum likelihood sequence estimation (MLSE) equalizer is the best, but its realization is most complex, which interferes the application in reality.

Figure 3:
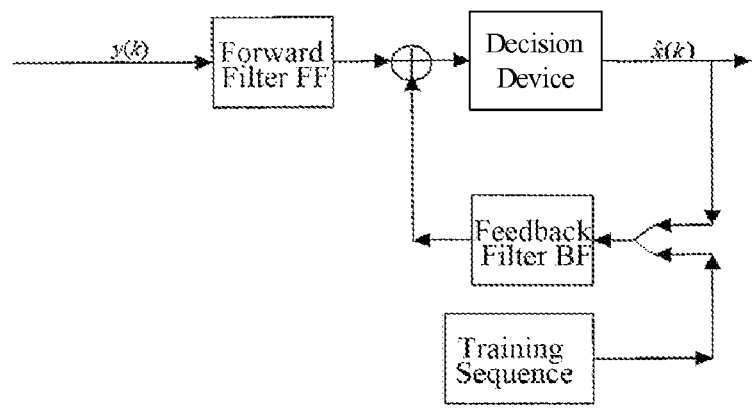
FIG. 3 is the structure diagram of decision feedback equalizer employed by the method of the present invention.

The operation principle of decision feedback equalizer is to eliminate the inter-symbol interference by using forward filter and backward filter; once a symbol is decided, the inter-symbol interference of this symbol on its subsequent symbol can be eliminated before deciding the subsequent symbol. As shown in FIG. 3, the decision feedback equalizer commonly includes a forward filter FF, a decision device and a feedback filter BF, in which the received signal y(k) is input into the forward filter FF and a passes the decision device, and symbol x̂(k) is output. The operation of decision feedback equalizer includes two parts: training process and tracking process. When training, the training sequence (or pre-amble) known by the receiving end enter the feedback filter BF orderly to train the equalizer. After training, the input of training sequence is disconnected, and the output of decision device enters into the feedback filter. Similarly, as for the burst equalization, at the beginning of burst, the coefficient of equalizer is adjusted by training sequence, after training sequence, the coefficient of equalizer is adjusted by the decision outputting sequence. The update of equalizer coefficient can use the least mean square LMS algorithm and the recursive least square RLS algorithm.

The existing pre-training equalization method is to use the known sequence transmitted during ranging process as the training sequence, and to train the equalizer during ranging process, because the length of training sequence during ranging process is long enough, the coefficient of equalizer is ensured to be convergent enough when the training is over; when the process of ranging process is over, entering the data transmission phrase, the equalizer uses the trained coefficient to track the wireless channel, once the accumulated change or break of wireless channel exceeds the equalization region of equalizer, re-training the equalizer, but this method is only adaptable to static channel or the situation of short burst interval due to its long training sequence.

Figure 4:
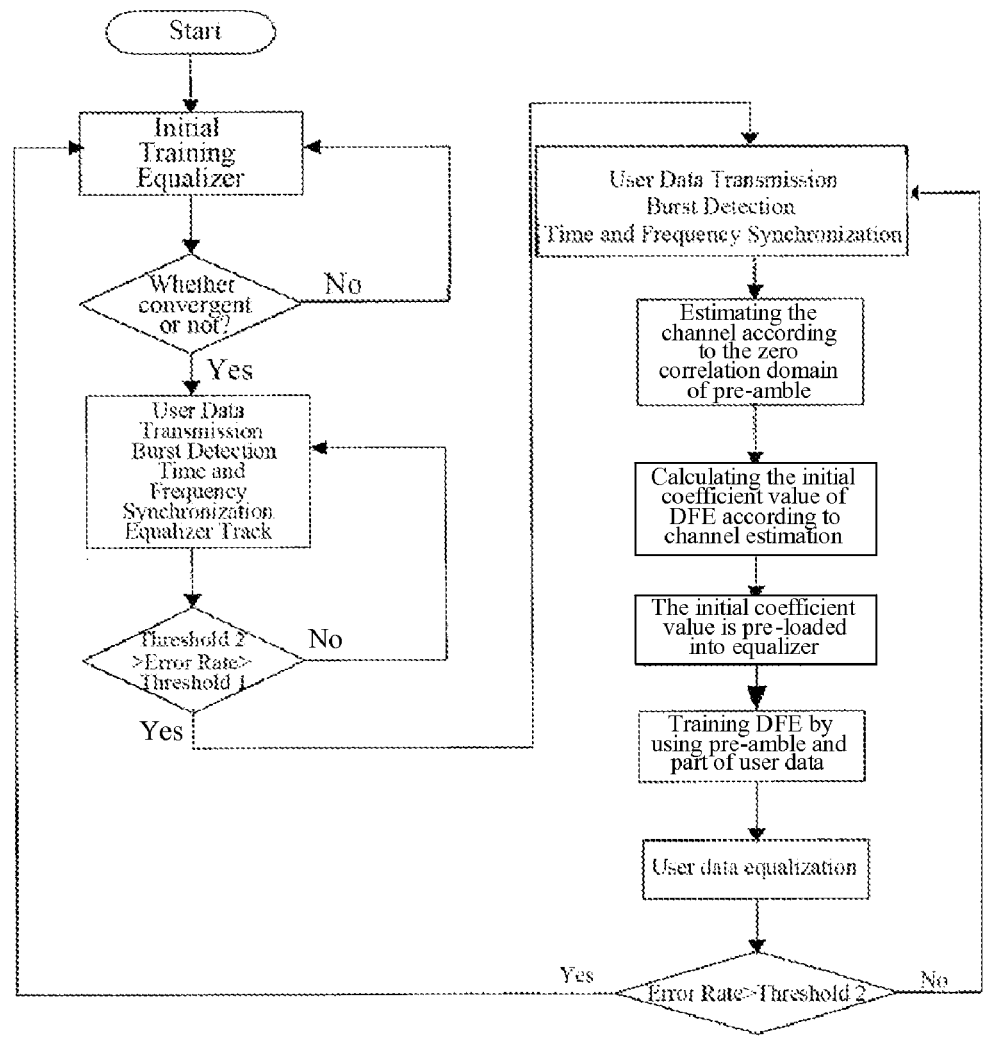
FIG. 4 is the schematic view of flowchart of uplink burst equalization method of the present invention.

The flowchart of uplink burst equalization method of the present invention is shown in FIG. 4. The process of transmitting training sequence for training the equalizer before transmitting user data is the process of initial training. In this training process, the present invention uses the long known sequence as reference sequence, such as the burst data package in the ranging process, the typical length is 200 symbols. When the coefficient of equalizer is convergent enough, the initial training process is over, and the transmission of user data starts, at the same time, the equalizer starts tracking wireless channel, and performs burst detection and synchronization of time and frequency. The coefficient of equalizer is stored to be used in next burst equalization. If the accumulated change of wireless channel results in the error rate exceeding threshold 1, but not exceeding threshold 2, the burst equalization is performed. If the accumulated change of wireless channel results in the error rate exceeding threshold 2, the equalizer will not be able to work normally, and the equalizer needs initial training again. Said threshold 1 is the critical point for the speed of channel change exceeding the tracking speed of equalizer; which is shown in detail as the error rate rising continuously, its value is the sum of the average error rate of continuous 5 burst data packages and 2 times the biggest absolute value of variable rate of error rate; threshold 2 is the threshold bit error rate (BER) corresponding to the receiver, with its typical value being $10^{-3}$.

In which, the process of burst equalization is as the following: selecting the pre-amble of one burst data package for estimating channel, and calculating the initial coefficient value of equalizer by using the estimation of channel, then loading the initial coefficient value to the equalizer, training the equalizer by using the pre-amble and parts of user data, and equalizing the user information after training, and finally, the decision device outputting decision information.

Next, each step of burst equalization process will be described in detail:

First, the channel estimation technique will be introduced. The present invention selects the pre-amble of burst data package to perform channel estimation, with its principle base is the zero correlation domain of reference sequence.

Figure 5:
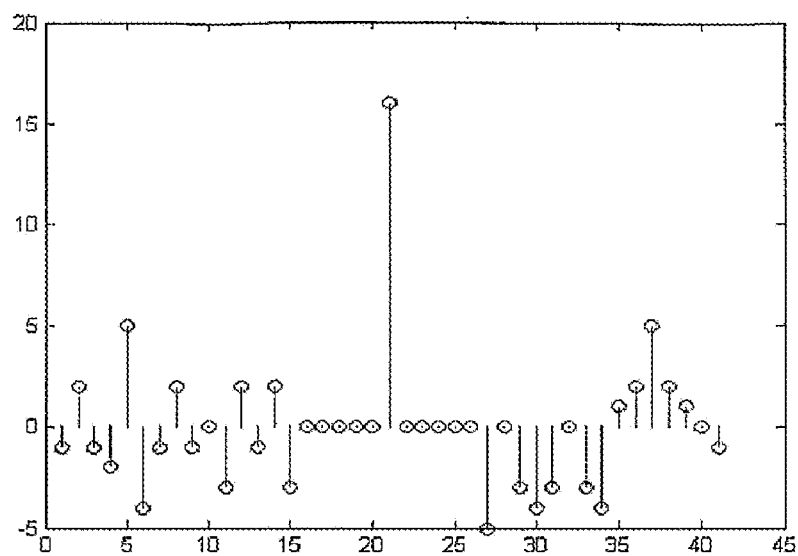
FIG. 5 is the zero correlation domain diagram of Newman-Hofman sequence.

In order to obtain the accurate value of channel impulse response by using the zero correlation domain of reference sequence, the reference sequence (pre-amble) and the cycle correlation function of its cycle pre-amble have to meet the following condition:

$$\theta_{rr}(p) = \begin{cases} N & p=0 \\ 0 & 0<|p|\leq D \end{cases} \quad (7)$$

in which, θ represents cycle correlation function, p represents the sequence number, N represents the sequence length, suffix rr represents the self-correlation of reference sequence. The region $-D<p<D$ meeting the above condition is referred as zero correlation domain, D is the length of zero correlation domain, the zero correlation domain of Newman-Holfman sequence is 5, as shown in FIG. 5.

Supposing that the length of zero correlation domain of the transmitted pre-amble is D, and the pre-amble uses BPSK modulation, the burst data package composed of pre-amble and user data arrives at the receiver after passing the wireless channel with a channel impulse response length of L. The receiver first locally generates the local reference signal of pre-amble which is the bilateral cycle spreading code of pre-amble, then samples the parts of received signal corresponding to pre-amble, then performs correlation calculation on the sampling signal corresponding to pre-amble and its local reference signal, thereby finishing the channel estimation. In the zero correlation domain, according to the character of zero correlation domain, the result of correlation meets the following relation:

$$\theta_{xv}(p) = c \times h(p) \, p=0,1,2,\ldots,L-1 \quad (8)$$

in which, θ represents cycle correlation function, p represents the sequence number, the suffix x of θ represents the sampling signal corresponding to the pre-amble, v represents the local reference signal of pre-amble, L is the length of the sampled channel impulse response, c is a constant of ratio.

It is obvious that the cycle correlation function $\theta_{xv}$ is the channel impulse response, therefore, in zero correlation domain, the channel impulse response can be obtained accurately by using the cycle correlation value, and the increase of precision of channel impulse response estimation can speed up the convergence of burst equalizer.

Because the ratio of main section/side section of Newman-Holfman sequence correlation diagram is as low as 1/8, the false possibility of burst detection can be reduced by using Newman-Holfman sequence as the pre-amble. But since the zero correlation domain length of Newman-Holfman sequence is 5, for the wireless channel with length of channel impulse response more than 5, the precision of channel estimation will decrease if used this channel. Therefore, the present invention can also use M sequence for performing channel estimation, but since the cycle correlation value of M sequence in its length region is −1 rather than the correlation value of 0 anticipated by the zero correlation domain, in order to calculate the channel impulse response by using M sequence according to the above steps of channel estimation, the zero correlation domain of M sequence has to be obtained: first using M sequence as the pre-amble, then constructing the local reference signal of pre-amble which is the bilateral cycle spreading of M sequence, but the sequence is composed of 1 and 0 rather than 1 and −1, thus, M sequence has a zero correlation domain with a same length with it, which greatly expands the selection region of zero correlation sequence. Other steps of channel estimation is same as that which employs Newman-Holfman sequence.

Taking M sequence with a length of 15 as an example, its original sequence is:

−1 −1 −1 1 −1 −1 1 1 −1 1 −1 1 1 1 1 then during cycle correlation, make the following sequence to be the cycle spreading sequence:

0 0 0 1 0 0 1 1 0 1 0 1 1 1 1 the zero correlation domain of the above two sequences is 15.

After obtaining the accurate estimation of channel impulse response, calculating the initial coefficient value of equalizer.

Supposing that the channel impulse response is vector h, the coefficient vector of forward filter of decision feedback equalizer is c, and the coefficient vector of backward filter is b, then the combining response of the channel and the forward filter is d=h*c, in which "*" represents convolution.

Supposing that the decision is right, the input signal of decision device is:

$$z_k = \sum_{i=-\infty}^{\infty} d(i)x(k-i) - \sum_{i=1}^{\infty} b(i)x(k-i) + n(t) \oplus c(t) \Big|_{t=KT} \quad (9)$$

in which, x is the symbol of transmitted data, n is additive Guass white noise.

Its mean squared error is:

$$MSE = E\left\{\sum_{i=-\infty}^{-1} d(i)x(k-i) + \sum_{i=1}^{\infty} (d(i)-b(i))x(k-i) + n(t) \oplus c(t)\Big|_{t=KT} + (d(0)-1)x(k)\right\}^2 \quad (10)$$

as for 16QAM modulation, making the data symbol x(k) to be $\{\pm 1 \pm 3\}$ based on equiprobability, and the channel impulse response length L=3, the mean squared error of symbol data $$\sigma_x^2 = E\{x(k)\}^2 = \frac{L^2-1}{3},$$

then the mean squared error of input signal is:

$$MSE = \sigma_x^2 \sum_{i=-\infty}^{-1} d^2(i) + \sigma_x^2 \sum_{i=1}^{\infty} (d(i)-b(i))^2 + \sigma_x^2(d(0)-1)^2 + \sigma^2 \quad (11)$$

in which, $$\sigma^2 = \frac{N_0}{2} \int_{-\infty}^{\infty} c^2(t)dt, \frac{N_0}{2}$$

is bilateral noise power density.

If the decision device is completely right, then $$\sum_{i=1}^{\infty} (d(i)-b(i))^2 = 0,$$

and the above equation can be simplified as:

$$MSE = \sigma_x^2 \sum_{i=-\infty}^{-1} d^2(i) + \sigma_x^2(d(0)-1)^2 + \sigma^2 \quad (12)$$

from the above equation we can see that, in order to minimize the mean squared error, these two requirements have to be met: the leading pulse of the whole channel response is minimum; d(0)=1; the energy of noise is minimum.

Considering that the channel leading pulse in LOS situation is very small, and there is strong couple relation between the forward filter and the backward filter of decision feedback equalize, after being trained by the training sequence, the inter-symbol interference left by forward filter can be eliminated by backward filter, so the coefficient of equalizer will converge till the inter-symbol interference is completely eliminated.

Therefore, the equalizer initial coefficient value can be calculated according to the following steps.

Supposing the length of channel impulse response L=2n+1, in which, the pulse with the biggest amplitude is h(0), the leading pulse is [h(−n) h(−n+1) . . . h(−1)], the proclitic pulse is [h(1) h(2) . . . h(n)]. The coefficient of forward filter in equalizer is exactly contrary to the channel impulse response, that is, the coefficient corresponding to the proclitic pulse is [c(−n) c(−n+1) . . . c(−1)], the coefficient corresponding to the leading pulse is [c(1) c(2) . . . c(n)]. The detailed calculating steps is:

First, the tap initial coefficient value of forward filter is:

$$c(0) = h^*(0)/|h(0)|^2 = 1/h(0), \quad (13)$$

other coefficients are 0.

Second, the tap initial coefficient value of back filter is:

$$[b(1) \ b(2) \ \ldots \ b(B)] = h^*(0)/|h(0)|^2 \times [h(1) \ h(2) \ \ldots \ h(B)] \quad (14)$$
$$= 1/h(0) \times [h(1) \ h(2) \ \ldots \ h(B)]$$

in which, B is the length of vector b of backward filter tap coefficient. Thus, the initial estimation of equalizer can be obtained. The quick obtaining of initial estimation of equalizer can shorten the training time, but in order to realize the finial convergence of equalizer, it further needs to train the equalizer.

In the process of burst equalization, the training on equalizer is performed according to the pre-amble and part of the user data: Firstly, performing warm-up training by using pre-amble as reference sequence for the purpose of preparing for entering into the decision feedback training with decision output as reference. After the warm-up training, most of the decision output is accurate. Because the pre-amble is limited, the data of the pre-amble needs to perform warm-up training on equalizer for at least two times. Secondly, performing decision feedback training, inputting part of user data into the equalizer as reference sequence for further training, when the equalizer is convergent completely, the equalizer performing equalization on user data all over again.

Figure 6:
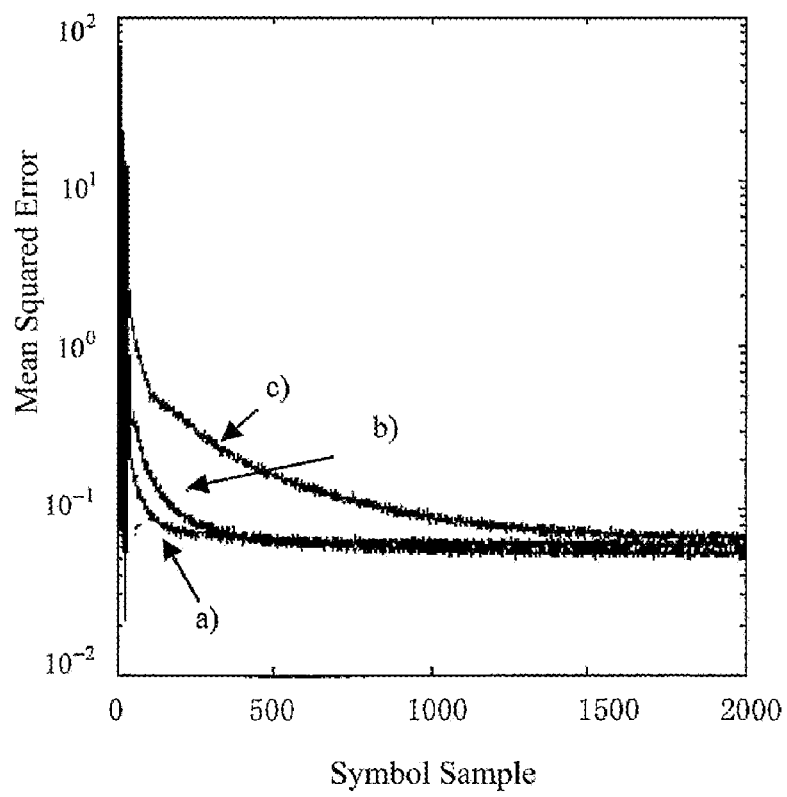
FIG. 6 is the comparative diagram of convergence speed between burst equalization method of the present invention and RLS method.

In order to prove the validity of the method of burst equalization of the present invention, we will compare the convergence speed of the present invention with the speed when employing RLS algorithm. The initial value of decision feedback equalizer is estimated according to the present invention, and is performed warm-up training for two times by the same pre-amble, then is turned to decision output train mode. FIG. 6 is the curve for the mean squared error changing along with the symbol sample when the signal to noise ratio SNR=20dB, in which, curve a represents the relationship of error rate of the present invention changing along with the signal to noise ratio, curve b represents the relationship of error rate of RLS algorithm changing along with the signal to noise ratio, curve c represents the relationship of error rate of equalizer changing along with the signal to noise ratio when the backward filter is not initialized. From curve a, we can see that by employing the method of the present invention, the least mean squared error MSE can reach $10^{-1}$ only after 115 symbols, while by employing RLS algorithm, 180 symbols are needed, therefore, the convergence speed of the present method is higher than that of RLS algorithm. As a comparison, FIG. 6 shows the convergent curve when the backward filter is not initialized, at this time, in order to make the equalizer convergent at last, additional training sequence with 70 symbols is needed. From the above, we can see that the effect of equalizer coefficient pre-load of the present invention is much better than the prior art.

Figure 7:
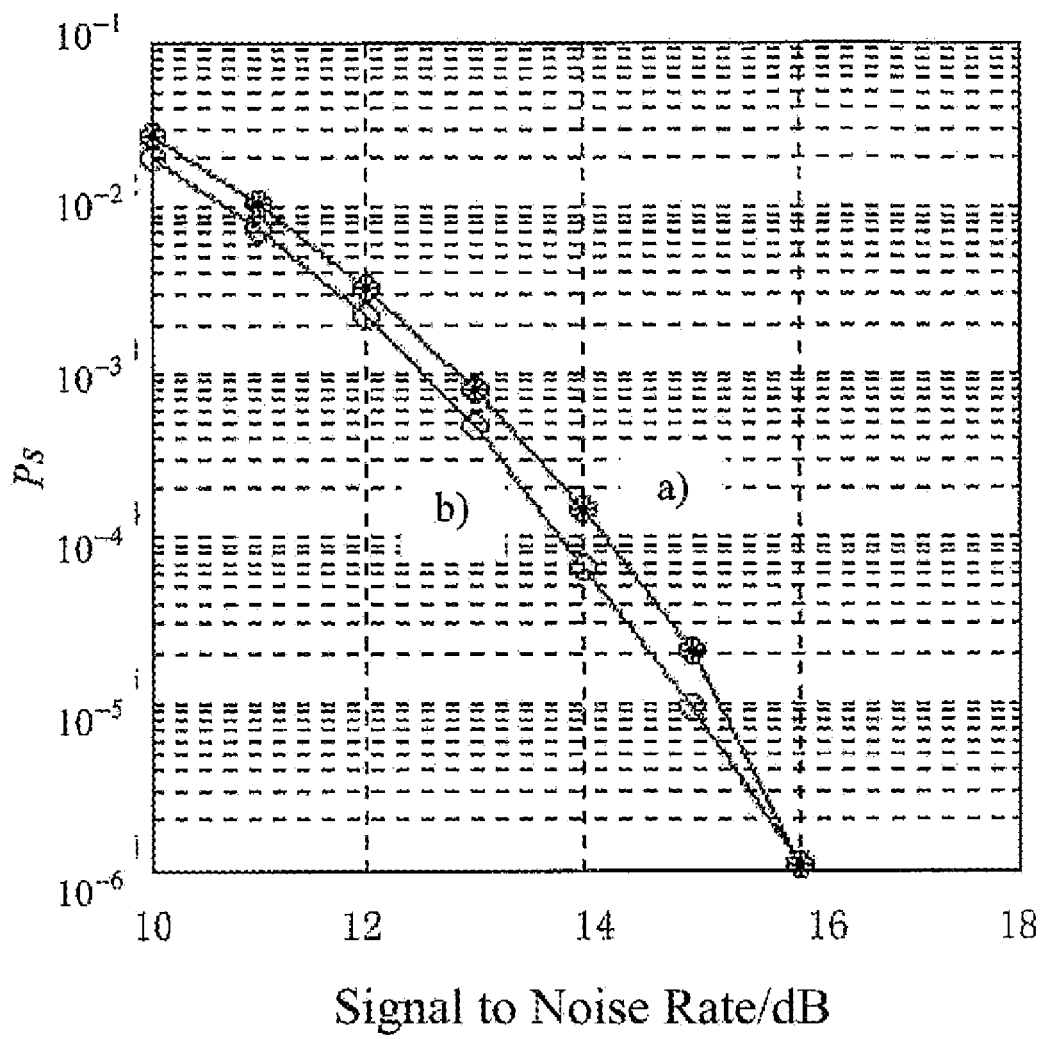
FIG. 7 is the comparative diagram of error rate between burst equalization method of the present invention and RLS method.

FIG. 7 is the curves for error symbol rate of the present method and that of RLS algorithm changing along with the signal to noise ratio, the error symbol rate is obtained from average statistics of 1000 burst data packages, in which, according to the present method, the error symbol rate is counted after employing pre-amble as reference (repeat 2 times) and 70 decision devices outputs training the equalizer, while by employing RLS algorithm, error symbol rate is counted after employing pre-amble as reference (repeat 2 times) and 138 decision devices outputs training the equalizer. From the curve we can see that, the error rate of the present invention approximates that of RLS algorithm when the signal to noise ratio SNR=10–16dB, which validates the validity of the present invention.

Lastly, it should be noted that the above embodiments is only to illustrate the technical scheme of the present invention, without any limitation. Although the present invention is described in detail referring to the preferred embodiments, the ordinary skilled person in the art should understand that the scheme of the present invention can be modified or substituted, without departing from the spirit and scope of the technical scheme of the present invention, all of which should be covered in the following claims.

What we claim is:

1. A method for uplink burst equalization in broad wide access system, in which an equalizer uses a decision feedback equalizer, comprising the following steps of:
    pre-training process including sending training sequence and training the equalizer before transmitting user data;
    channel tracking process including recording coefficient after convergence of the equalizer, starting transmitting the user data, and the equalizer tracking wireless channel for channel changes;
    if channel changes result in an error rate exceeding a first threshold but not exceeding a second threshold, entering into a burst equalization process; and
    entering into the pre-training process again if the channel changes result in an error rate exceeding the second threshold;
    wherein said first threshold is a critical point when the changing speed of the channel exceed the tracking speed of the equalizer; said second threshold is a threshold bit error rate corresponding to a receiver.

2. The method for uplink burst equalization in broad wide access system of claim 1, wherein said pre-training process uses long known sequence as reference sequence to perform said training the equalizer.

3. The method for uplink burst equalization in broad wide access system of claim 1, wherein said burst equalization process further comprises the following steps of:
    using pre-amble of a burst data package as the reference sequence, performing channel estimation in a zero correlation domain, calculating initial coefficient value of equalizer according to channel estimation, and pre-loading the calculated initial coefficient value into the equalizer, and using the pre-amble and part of the user data as the reference sequence to train the equalizer, making the equalizer convergent sufficiently; after the training, the equalizer using the user data as the reference sequence to equalize the user data, and outputting decision information.

4. The method for uplink burst equalization in broad wide access system of claim 3, wherein, said pre-amble employs Newman-Holfman sequence of 16 bits, and employs a BPSK modulation form; said channel estimation further includes the steps of: generating local reference signal of the pre-amble locally, which is bilateral cycle spreading signal of the pre-amble; sampling the received signal which the pre-amble corresponds to, and performing correlation operation between the sampled signal corresponding to the pre-amble and the local reference signal, therefore finishing the channel estimation.

5. The method for uplink burst equalization in broad wide access system of claim 3, wherein the pre-amble employs M sequence, said channel estimation includes steps of: local reference signal for generating the pre-amble being bilateral cycle spreading signal of M sequence, and the local reference signal of the pre-amble being a sequence composed of 1 and 0; sampling received signal which the pre-amble corresponds to, and performing correlation operation between the sampled signal corresponding to the pre-amble and the local reference signal, therefore finishing the channel estimation.

6. The method for uplink burst equalization in broad wide access system of claim 3, wherein, said calculating the initial coefficient value of equalizer further includes the steps of:
    calculating tap coefficient initial value of a forward filter:

$c(0)=h^*(0)/|h(0)|^2=1/h(0)$, other coefficients are 0;

calculating tap initial coefficient value of a backward filter:

$[b(1)b(2) \ldots b(B)]=h^*(0)/|h(0)|^2 \times [h(1)h(2) \ldots h(B)]= 1/h(0) \times [h(1)h(2) \ldots h(B)]$;

in which, h represents channel impulse response vector, c represents coefficient vector of the forward filter of the decision feedback equalizer, b represents coefficient vector of the backward filter, B is the length of the coefficient vector of the backward filter, in which, a pulse with the biggest amplitude is h(0), a previous impulse response pulse is [h(−n) h(−n+1) ... h(−1)], a subsequent impulse response pulse is [h(1) h(2) ... h(n)]; the coefficient of the forward filter and the coefficient corresponding to the subsequent impulse response pulse in the equalizer is [c(−n) c(−n) ... c(−1)], the coefficient corresponding to the previous impulse response pulse is [c(1) c(2) ... c(n)].

7. The method for uplink burst equalization in broad wide access system of claim 3, wherein said training equalizer further includes the steps of:
    using the pre-amble as the reference sequence to perform warm-up training for at least two times to the equalizer, after the warm-up training, most of the decision outputs being correct; and inputting part of the user data into the equalizer as the reference sequence for further training, till the equalizer being convergent completely.

8. The method for uplink burst equalization in broad wide access system of claim 1, wherein the value of the first threshold is the sum of the average of error rate of five continuous burst data packages and twice the biggest absolute value of error rate variable; a typical value of the second threshold is $10^{-3}$.

* * * * *

UNITED STATES PATENT AND TRADEMARK OFFICE
CERTIFICATE OF CORRECTION

PATENT NO. : 7,664,171 B2 Page 1 of 1
APPLICATION NO. : 10/583813
DATED : February 16, 2010
INVENTOR(S) : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 848 days.

Signed and Sealed this

Thirtieth Day of November, 2010

David J. Kappos
*Director of the United States Patent and Trademark Office*